US012626922B2

(12) United States Patent
Iida et al.

(10) Patent No.: US 12,626,922 B2
(45) Date of Patent: *May 12, 2026

(54) SECONDARY BATTERY

(71) Applicant: Panasonic Intellectual Property Management Co., Ltd., Osaka (JP)

(72) Inventors: Kazuhiro Iida, Nara (JP); Masanobu Takeuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 617 days.

This patent is subject to a terminal disclaimer.

(21) Appl. No.: 17/763,053

(22) PCT Filed: Jul. 28, 2020

(86) PCT No.: PCT/JP2020/028823
§ 371 (c)(1),
(2) Date: Mar. 23, 2022

(87) PCT Pub. No.: WO2021/059725
PCT Pub. Date: Apr. 1, 2021

(65) Prior Publication Data
US 2022/0393169 A1 Dec. 8, 2022

(30) Foreign Application Priority Data
Sep. 27, 2019 (JP) ................................. 2019-177964

(51) Int. Cl.
*H01M 4/587* (2010.01)
(52) U.S. Cl.
CPC .... *H01M 4/587* (2013.01); *H01M 2300/0002* (2013.01)
(58) Field of Classification Search
CPC ...................... H01M 4/587; H01M 2300/0002
See application file for complete search history.

(56) References Cited

U.S. PATENT DOCUMENTS

| | | | |
|---|---|---|---|
| 6,040,092 A | 3/2000 | Yamada et al. | |
| 6,645,667 B1 | 11/2003 | Iwamoto et al. | |

(Continued)

FOREIGN PATENT DOCUMENTS

| | | |
|---|---|---|
| CN | 105580184 A | 5/2016 |
| JP | 2001-052747 A | 2/2001 |

(Continued)

OTHER PUBLICATIONS

Extended (Supplementary) European Search Report dated Nov. 18, 2022, issued in counterpart EP application No. 20868480.3. (10 pages).

(Continued)

*Primary Examiner* — Armindo Carvalho, Jr.
(74) *Attorney, Agent, or Firm* — WHDA, LLP

(57) ABSTRACT

This secondary battery comprises a positive electrode, a negative electrode, and an electrolyte solution. The electrolyte solution includes a solvent containing water as a main component, and a lithium salt. The negative electrode has a negative electrode active material that includes a carbon material. The Raman spectrum of the carbon material, which is obtained by Raman spectroscopy, indicates that the peak intensity ratio between the D-band and the G-band (D/G) is 0.3 or greater. This secondary battery can suppress the reductive decomposition of the water-based electrolyte solution.

4 Claims, 1 Drawing Sheet

(56) References Cited

U.S. PATENT DOCUMENTS

| | | | |
|---|---|---|---|
| 10,411,302 B2 | 9/2019 | Park et al. | |
| 2013/0244121 A1 | 9/2013 | Gogotsi et al. | |
| 2014/0065479 A1 | 3/2014 | Yamada et al. | |
| 2015/0349332 A1 * | 12/2015 | Azami ................ | H01M 10/058 |
| | | | 429/188 |
| 2016/0043384 A1 * | 2/2016 | Zhamu .................. | H01M 4/386 |
| | | | 427/122 |
| 2016/0226100 A1 | 8/2016 | Yamada et al. | |
| 2017/0169912 A1 | 6/2017 | Gogotsi et al. | |
| 2017/0373351 A1 | 12/2017 | Kawai et al. | |
| 2018/0019475 A1 | 1/2018 | Adamson et al. | |
| 2018/0123171 A1 | 5/2018 | Takechi et al. | |
| 2018/0219221 A1 * | 8/2018 | Yamauchi ......... | H01M 10/0567 |
| 2018/0366726 A1 | 12/2018 | Kawakami et al. | |
| 2019/0036173 A1 | 1/2019 | Tojigamori et al. | |
| 2019/0088948 A1 | 3/2019 | Tojigamori et al. | |
| 2019/0089007 A1 | 3/2019 | Suyama et al. | |
| 2020/0091510 A1 | 3/2020 | Park et al. | |
| 2021/0028452 A1 * | 1/2021 | Su ........................ | H01M 4/521 |

FOREIGN PATENT DOCUMENTS

| | | | |
|---|---|---|---|
| JP | 3475488 B2 | 12/2003 | |
| JP | 2018-006358 A | 1/2018 | |
| JP | 2018-073819 A | 5/2018 | |
| JP | 2018139171 A * | 9/2018 | |
| JP | 6423453 B2 | 11/2018 | |
| JP | 2019-029077 A | 2/2019 | |
| JP | 2019-057359 A | 4/2019 | |
| KR | 10-2006-0063035 A | 6/2006 | |
| WO | 2004/023589 A1 | 3/2004 | |

OTHER PUBLICATIONS

Office Action dated May 13, 2024, issued in counterpart to CN Application No. 202080066551.1, with partial English translation. (10 pages).

Office Action dated Nov. 10, 2023, issued in counterpart CN application No. 202080066551.1, with partial English translation. (12 pages).

International Search Report dated Oct. 13, 2020, issued in counterpart International Application No. PCT/JP2020/028823, with English translation. (5 pages).

Leroy et al., Influence of the lithium salt nature over the surface film formation on a graphite electrode in Li—ion batteries: An XPS study, Dec. 12, 2006, Elsevier; Cited in US Office Action dated Dec. 16, 2024, issued in related U.S. Appl. No. 17/763,102. (12 pages).

Non-Final Office Action dated Dec. 16, 2024, issued in U.S. Appl. No. 17/763,102. (13 pages).

International Search Report dated Oct. 13, 2020, issued in Application No. PCT/JP2020/028825. (4 pages).

Final Office Action dated Nov. 27, 2024, issued in U.S. Appl. No. 17/763,074. (13 pages).

Non-Final Office Action dated Aug. 12, 2024, issued in U.S. Appl. No. 17/763,074. (26 pages).

Office Action dated Sep. 26, 2023, issued in CN Application No. 202080067560.2, with Partial English translation. (11 pages).

Profatilova I. A. et al., Enhanced thermal properties of the solid electrolyte interphase formed on graphite in an electrolyte with fluoroethylene carbonate, Electrochimica Acta, vol. 54, 2009, pp. 4445-4450; Cited in Extended Supplementary European Search Report dated Nov. 18, 2022. (6 pages).

Extended Supplementary European Search Report dated Nov. 18, 2022, issued in Application No. 20867809.4. (8 pages).

International Search Report dated Oct. 13, 2020, issued in Application No. PCT/JP2020/028824. (4 pages).

* cited by examiner

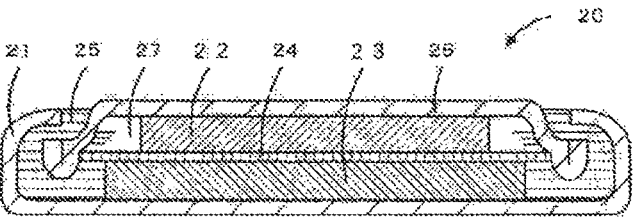

SECONDARY BATTERY

CROSS-REFERENCE TO RELATED APPLICATION

This application is a National Phase Application filed under 35 U.S.C. § 371 of International Application No. PCT/JP2020/028823 filed on Jul. 28, 2020 which claims the benefit of priorities under 35 U.S.C. § 119 (a) of Japanese Patent Application No. 2019-177964 filed in Japan on Sep. 27, 2019, the contents of which are incorporated herein by reference.

TECHNICAL FIELD

The present disclosure generally relates to a secondary battery.

BACKGROUND ART

Commonly used as a secondary battery with a high output and a high energy density is a lithium-ion secondary battery comprising a positive electrode, a negative electrode, and an electrolyte liquid, and performing charge and discharge by allowing lithium ions to travel between the positive electrode and the negative electrode. In the conventional secondary battery, an organic solvent-based electrolyte liquid is used for achieving the high energy density.

However, organic solvents are generally flammable, and pose an important challenge of ensuring safety. In addition, organic solvents have a lower ion conductivity than an aqueous solution, and therefore causes a problem of not-sufficient rapid charge-discharge characteristics.

In view of such problems, a secondary battery using an electrolyte liquid containing water (hereinafter, which may be referred to as an aqueous electrolyte liquid) has been studied. For example, Patent Literature 1 proposes use of an aqueous solution including an alkaline salt at a high concentration as an aqueous electrolyte liquid of a secondary battery. Patent Literature 2 proposes a use of an aqueous electrolyte liquid in which an organic carbonate is added into an aqueous solution including an alkaline salt at a high concentration.

CITATION LIST

Patent Literature

PATENT LITERATURE 1: JP 6423453 B
PATENT LITERATURE 2: JP 2018-073819A

SUMMARY

In a secondary battery having an aqueous electrolyte liquid, use of a carbon material as a negative electrode active material may lead to lowered operation voltage and potentially increased capacity. However, a conventional carbon material, unfortunately, may enhance a reductive decomposition of the aqueous electrolyte liquid and inhibit charge and discharge reactions.

A secondary battery of an aspect of the present disclosure comprises: a positive electrode; a negative electrode; and an electrolyte liquid, wherein the electrolyte liquid includes: a solvent mainly composed of water; and a lithium salt, the negative electrode has a negative electrode active material including a carbon material, the carbon material has a peak intensity ratio of a D band to a G band (D/G value) of 0.3 or more in a Raman spectrum obtained by Raman spectroscopy.

According to the secondary battery according to the present disclosure, the reductive decomposition of the aqueous electrolyte liquid may be inhibited.

BRIEF DESCRIPTION OF DRAWING

The Drawing is a schematic sectional view illustrating an example of a secondary battery of the present embodiment.

DESCRIPTION OF EMBODIMENTS

Generally, the reductive decomposition of an aqueous electrolyte liquid including a solvent including water and a lithium salt occurs at a potential between near or lower than approximately 2 V with reference to Li, and charge and discharge reactions of a carbon material occur at a potential equal to or lower than the reductive decomposition of the aqueous electrolyte liquid. Thus, a vigorous reductive decomposition of the aqueous electrolyte liquid during a charge process consumes a charging current, which inhibits progress of a charge reaction of a negative electrode active material. The present inventors have made intensive investigation, and as a result, have found that a crystallinity of a carbon material (negative electrode active material) may inhibit the reductive decomposition of the aqueous electrolyte liquid, and have reached a secondary battery of the following aspect.

A secondary battery of an aspect of the present disclosure comprises: a positive electrode; a negative electrode; and an electrolyte liquid, wherein the electrolyte liquid includes: a solvent mainly composed of water; and a lithium salt, the negative electrode has a negative electrode active material including a carbon material, the carbon material has a peak intensity ratio of a D band to a G band (D/G value) of 0.3 or more in a Raman spectrum obtained by Raman spectroscopy. According to the secondary battery of an aspect of the present disclosure, the reductive decomposition of the aqueous electrolyte liquid is inhibited.

In a Raman spectrum obtained by Raman spectroscopy, "D band" denotes a Raman band near 1360 cm$^{-1}$ derived from a defect or an amorphous carbon component. "G band" denotes a Raman band near 1580 cm$^{-1}$ derived from a C=C bond. Thus, a peak intensity ratio of the D band to the G band (hereinafter, which may be referred to simply as a D/G value) of 0.3 or more indicates an amorphous surface of the carbon material.

When the surface of the carbon material is amorphous, which has many electrochemically active points, a thick coating is formed on the surface of the carbon material by the reductive decomposition of the aqueous electrolyte liquid. The formation of such a thick coating breaks a contact between water in the aqueous electrolyte liquid and the carbon material to inhibit further reductive decomposition of the aqueous electrolyte liquid. When the D/G value is less than 0.3, the thick coating is not formed on the surface of the carbon material (for example, a spotted coating is formed on the surface of the carbon material), and water in the aqueous electrolyte liquid contacts with the carbon material to proceed further reductive decomposition of the aqueous electrolyte liquid. Accordingly, setting the D/G value of the carbon material to be 0.3 or more as an aspect of the present disclosure may inhibit the reductive decomposition of the aqueous electrolyte liquid.

Describing the crystallinity of the carbon material, the carbon material preferably has a full width at half maximum (2θ) of a diffraction peak of a (004) surface of 1.0° or smaller as determined by X-ray diffraction measurement. The full width at half maximum (2θ) of the diffraction peak of the (004) surface of 1.0° or smaller indicates a highly graphitized (crystallized) carbon material. Thus, a carbon material having a D/G value of 0.3 or more and a full width at half maximum of the diffraction peak of the (004) surface of 1.0° or smaller, which has an amorphous surface but has a crystallized inside, and is a material with high crystallinity as an entirety of the carbon material. Such a carbon material in which an appropriately thick coating is formed on the surface (the coating is not too thick) more inhibit the reductive decomposition of the aqueous electrolyte liquid.

Hereinafter, an embodiment of the secondary battery according to the present disclosure will be described in detail.

The shape of the secondary battery of the present embodiment is not particularly limited, and examples thereof include coin, button, sheet, stacked, cylindrical, flat, and rectangular shapes. The secondary battery may be a beaker-shaped cell as described in the following Example. The Drawing is a schematic sectional view illustrating an example of the secondary battery of the present embodiment. A secondary battery 20 illustrated in the Drawing comprises: a cap-shaped battery case 21; a positive electrode 22 provided in the upper part of the battery case 21; a negative electrode 23 provided at a position opposite to the positive electrode 22 with a separator 24 interposed therebetween; a gasket 25 formed with an insulating material; and a sealing plate 26 to seal the battery case 21 with the gasket 25 provided on an opening of the battery case 21. In the secondary battery 20 illustrated in the Drawing, an electrolyte liquid 27 fills a space between the positive electrode 22 and the negative electrode 23. Hereinafter, the electrolyte liquid 27, the positive electrode 22, the negative electrode 23, and the separator 24 will be described in detail.

The electrolyte liquid 27 is an aqueous electrolyte liquid including: a solvent mainly composed of water; and a lithium salt. Since including water, which has no flammability, the aqueous electrolyte liquid may enhance the safety of the secondary battery 20. Here, being mainly composed of water is referred to a content of water being 50% or more at a volume rate based on a total amount of the solvent included in the electrolyte liquid 27. The content of water based on a total amount of the solvent included in the electrolyte liquid 27 is preferably 90% or more at a volume rate from the viewpoints of enhancement of the safety of the secondary battery 20, and the like.

In the electrolyte liquid 27, a content ratio of water to the lithium salt is preferably 15:1 or less, and more preferably 4:1 or less at a molar ratio. The content ratio of water to the lithium salt within the above range may enlarge a potential window of the electrolyte liquid 27 to raise an applied voltage to the secondary battery 20, for example. From the viewpoint of the safety of the secondary battery 20, the content rate of water to the lithium salt is preferably 1.5:1 or more at a molar ratio.

The electrolyte liquid 27 may include a solvent other than water. Examples of the solvent other than water include esters, ethers, nitriles, alcohols, ketones, amines, amides, sulfur compounds, and hydrocarbons. The organic solvent may be a halogen-substituted solvent in which at least some hydrogens in these solvents are substituted with halogen atoms such as fluorine. Specific examples thereof include: cyclic carbonates such as ethylene carbonate, propylene carbonate, vinylidene carbonate, and butylene carbonate; chain carbonates such as dimethyl carbonate, methyl ethyl carbonate, and diethyl carbonate; and fluorinated carbonates including fluorine as a constitution element such as fluoroethylene carbonate, fluorodimethyl carbonate, and methyl fluoropropionate. In particular, among the above examples, the cyclic carbonates and the fluorinated carbonates including fluorine as a constitution element are preferable, and in particular, ethylene carbonate, propylene carbonate, and fluoroethylene carbonate are more preferable, from the viewpoints of, for example, inhibition of self-discharge of the battery and improvement in the charge-discharge efficiency of the battery. A content of these organic solvents based on a total amount of the solvent is preferably 50% to 90% at a volume rate.

The content ratio of the solvent other than water to the lithium salt is preferably within a range of 1:0.01 to 1:5, and more preferably within a range of 1:0.05 to 1:1, at a molar ratio. With the content ratio within the above range, lowering of the self-discharge of the battery may be inhibited effectively and the charge-discharge efficiency of the battery may be further improved.

Any compound may be used as the lithium salts as long as it is dissolved and dissociated in the solvent containing water to provide lithium ions in the electrolyte liquid 27. The lithium salt preferably causes no deterioration of battery characteristics due to a reaction with materials constituting the positive electrode and the negative electrode. Examples of such a lithium salt include: salts with an inorganic acid such as perchloric acid, sulfuric acid, and nitric acid; salts with a halide ion such as chloride ion and bromide ion; and salts with an organic anion including a carbon atom in the structure.

Examples of the organic anion constituting the lithium salt include anions represented by the following general formulas (i) to (vi).

$$(R^1SO_2)(R^2SO_2)N^- \qquad (i)$$

(Each of $R^1$ and $R^2$ is independently selected from an alkyl group or a halogen-substituted alkyl group. $R^1$ and $R^2$ may be bonded to each other to form a ring.)

$$R^1SO_3^- \qquad (ii)$$

($R^3$ is selected from an alkyl group or a halogen-substituted alkyl group.)

$$R^4CO_2^- \qquad (iii)$$

($R^4$ is selected from an alkyl group or a halogen-substituted alkyl group.)

$$(R^5SO_2)_3C^- \qquad (iv)$$

($R^5$ is selected from an alkyl group or a halogen-substituted alkyl group.)

$$[(R^6SO_2)N(SO_2)N(R^7SO_2)]^{2-} \qquad (v)$$

($R^6$ and $R^7$ are selected from an alkyl group or a halogen-substituted alkyl group.)

$$[(R^8SO_2)N(CO)N(R^9SO_2)]^{2-} \qquad (vi)$$

($R^8$ and $R^9$ are selected from an alkyl group or a halogen-substituted alkyl group.)

In the general formulas (i) to (vi), the number of carbon atoms of the alkyl group or the halogen-substituted alkyl group is preferably 1 to 6, more preferably 1 to 3, and still more preferably 1 to 2. The halogen in the halogen-substituted alkyl group is preferably fluorine. The number of the halogen substitution of the halogen-substituted alkyl group is equal to or smaller than the number of hydrogen atoms of the original alkyl group.

Each of $R^1$ to $R^9$ is, for example, a group represented by the following general formula (vii).

$$C_nH_aF_bCl_cBr_dI_e \quad\quad\quad (vii)$$

(n is an integer of 1 or more, a, b, c, d, and e are integers of 0 or more, and $2n+1=a+b+c+d+e$ is satisfied).

Specific examples of the organic anions represented by the general formula (i) include bis(trifluoromethanesulfonyl)imide (TFSI; $[N(CF_3SO_2)_2]^-$), bis(perfluoroethanesulfonyl)imide (BETI; $[N(C_2F_5SO_2)_2]^-$), and (perfluoroethanesulfonyl)(trifluoromethanesulfonyl)imide ($[N(C_2F_5SO_2)(CF_3SO_2)]^-$). Specific examples of the organic anions represented by the general formula (ii) include $CF_3SO_3^-$ and $C_2F_5SO_3^-$. Specific examples of the organic anions represented by the general formula (iii) include $CF_3CO_2^-$ and $C_2F_5CO_2$. Specific examples of the organic anions represented by the general formula (iv) include tris(trifluoromethanesulfonyl)carbon acid ($[(CF_3SO_2)_3C]^-$) and tris(perfluoroethanesulfonyl)carbon acid ($[(C_2F_5SO_2)_3C]^-$).

Specific examples of the organic anions represented by the general formula (v) include sulfonyl bis(trifluoromethanesulfonyl)imide ($[(CF_3SO_2)N(SO_2)N(CF_3SO_2)]^{2-}$), sulfonyl bis(perfluoroethanesulfonyl)imide ($[(C_2F_5SO_2)N(SO_2)N(C_2F_5SO_2)]^{2-}$), and sulfonyl (perfluoroethanesulfonyl)(trifluoromethanesulfonyl)imide ($[(C_2F_5SO_2)N(SO_2)(CF_3SO_2)]^{2-}$). Specific examples of the organic anions represented by the general formula (vi) include carbonyl bis(trifluoromethanesulfonyl)imide ($[(CF_3SO_2)N(CO)N(CF_3SO_2)]^{2-}$), carbonyl bis(perfluoroethanesulfonyl)imide ($[(C_2F_5SO_2)N(CO)N(C_2F_5SO_2)]^{2-}$), and carbonyl (perfluoroethanesulfonyl)(trifluoromethanesulfonyl)imide ($[(C_2F_5SO_2)N(CO)N(CF_3SO_2)]^{2-}$).

Examples of organic anions other than the organic anions of the general formulas (i) to (vi) include anions such as bis(1,2-benzenediolate(2-)-O,O')borate, bis(2,3-naphthalenediolate(2-)-O,O')borate, bis(2,2'-biphenyldiolate(2-)-O,O')borate, and bis(5-fluoro-2-olate-1-benzenesulfonate-O,O')borate.

The anion constituting the lithium salt is preferably an imide anion. Specific example of preferable imide anions include, in addition to the imide anions exemplified as the organic anions represented by the general formula (i), bis(fluorosulfonyl)imide (FSI; $[N(FSO_2)_2]^-$) and (fluorosulfonyl)(trifluoromethanesulfonyl)imide (FTI; $[N(FSO_2)(CF_3SO_2)]^-$).

Examples of the lithium salt having lithium ion and the imide anion include, from the viewpoints of effective inhibition of the self-discharge of the battery and the like, lithium bis(trifluoromethanesulfonyl)imide (LiTFSI), lithium bis(perfluoroethanesulfonyl)imide (LiBETI), lithium (perfluoroethanesulfonyl)(trifluoromethanesulfonyl)imide, lithium bis(fluorosulfonyl)imide (LiFSI), and lithium (fluorosulfonyl)(trifluoromethanesulfonyl)imide (LiFTI). These lithium salts may be used singly, or may be used in combination of two or more thereof.

Specific examples of other lithium salts include $CF_3SO_3Li$, $C_2F_5SO_3Li$, $CF_3CO_2Li$, $C_2F_5CO_2Li$, $(CF_3SO_2)_3CLi$, $(C_2F_5SO_2)_3CLi$, $(C_2F_5SO_2)_2(CF_3SO_2)CLi$, $(C_2F_5SO_2)(CF_3SO_2)_2CLi$, $[(CF_3SO_2)N(SO_2)N(CF_3SO_2)]Li_2$, $[(C_2F_5SO_2)N(SO_2)N(C_2F_5SO_2)]Li_2$, $[(C_2F_5SO_2)N(SO_2)N(CF_3SO_2)]Li_2$, $[(CF_3SO_2)N(CO)N(CF_3SO_2)]Li_2$, $[(C_2F_5SO_2)N(CO)N(C_2F_5SO_2)]Li_2$, $[(C_2F_5SO_2)N(CO)N(CF_3SO_2)]Li_2$, lithium bis(1,2-benzenediolate(2-)-O,O')borate, lithium bis(2,3-naphthalenediolate(2-)-O,O')borate, lithium bis(2, 2'-biphenyldiolate(2-)-O,O')borate, lithium bis(5-fluoro-2-olate-1-benzenesulfonate-O,O')borate, lithium perchlorate ($LiClO_4$), lithium chloride (LiCl), lithium bromide (LiBr), lithium hydroxide (LiOH), lithium nitrate ($LiNO_3$), lithium sulfate ($Li_2SO_4$), lithium sulfide ($Li_2S$), and lithium hydroxide (LiOH). These lithium salts may be used singly, or may be used in combination of two or more thereof.

The electrolyte liquid 27 preferably includes an additive. The additive is added for improving, for example, battery performances, and any of conventionally known additives may be used. In particular, a dicarbonyl group-containing compound is preferable from the viewpoints of forming an electrochemically stable coating on the carbon material by the reduction reaction of the electrolyte liquid 27 to effectively inhibit the reductive decomposition reaction of the electrolyte liquid 27, and the like.

Examples of the dicarbonyl group-containing compound include succinic acid, glutaric acid, phthalic acid, maleic acid, citraconic acid, glutaconic acid, itaconic acid, and diglycolic acid. The dicarbonyl group-containing compound may be an anhydride, and examples thereof include succinic anhydride, glutaric anhydride, phthalic anhydride, maleic anhydride, citraconic anhydride, glutaconic anhydride, itaconic anhydride, and diglycolic anhydride. Among the above compounds, succinic acid, succinic anhydride, maleic acid, maleic anhydride, diglycolic acid, glutaric acid, and the like are preferable from the viewpoint of forming an electrochemically stable coating on the carbon material to effectively inhibit the reductive decomposition reaction of the electrolyte liquid 27. Among them, succinic acid and succinic anhydride are preferable. These compounds may be used singly, or may be used in combination of two or more thereof.

The content of the additive is preferably, for example, 0.05 mass % or more and 5.0 mass % or less, and more preferably 0.5 mass % or more and 3.0 mass % or less, based on a total amount of the electrolyte liquid 27. The content within the above range may effectively inhibit the reductive decomposition reaction of the electrolyte liquid 27 compared with a case out of the above range.

The positive electrode 22 comprises, for example, a positive electrode current collector and a positive electrode mixture layer formed on the positive electrode current collector. For the positive electrode current collector, a foil of a metal electrochemically and chemically stable within a potential range of the positive electrode, a film in which such a metal is disposed on a surface layer thereof, and the like may be used. A form of the positive electrode current collector is not particularly limited, and a porous body of the metal such as, for example, a mesh, a punching sheet, and an expanded metal may be used. For a material of the positive electrode current collector, known metals usable in a secondary battery using an aqueous electrolyte liquid and the like may be used.

Examples of such a metal include stainless steel, Al, an aluminum alloy, and Ti. A thickness of the positive electrode current collector is preferably, for example, 3 μm or more and 50 μm or less from the viewpoints of current collectability, mechanical strength, and the like.

The positive electrode mixture layer includes a positive electrode active material. The positive electrode mixture layer may include a binder, a conductive agent, and the like.

Examples of the positive electrode active material include a lithium-transition metal oxide containing lithium (Li) and a transition metal element such as cobalt (Co), manganese (Mn), and nickel (Ni). In addition, examples of the positive electrode active material include a transition metal sulfide, a metal oxide, a lithium-containing polyanionic compound including one or more transition metals such as lithium iron phosphate (LiFePO₄) and lithium iron pyrophosphate (Li₂FeP₂O₇), a sulfur-base compound (Li₂S), and oxygen and an oxygen-containing metal salt such as lithium oxide. The positive electrode active material is preferably the lithium-containing transition metal oxide, and preferably includes at least one of the group consisting of Co, Mn, and Ni as the transition metal element.

The lithium-transition metal oxide may include an additional element other than Co, Mn, and Ni, and for example, may include aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb), and silicon (Si).

Specific examples of the lithium-transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (in each chemical formula, M is at least one of the group consisting of Na, Mg, Sc, Y, Mn, Fe, Co, Ni, Cu, Zn, Al, Cr, Pb, Sb, and B, $0 < x \leq 1.2$, $0 < y \leq 0.9$, $2.0 \leq z \leq 2.3$). The lithium-transition metal oxide may be used singly, or may be used in combination of a plurality thereof. The lithium-transition metal oxide preferably contains 80 mol % or more of Ni based on a total amount of transition metals excluding lithium from the viewpoint of increase in a capacity. From the viewpoint of a stability of a crystal structure, the lithium-transition metal oxide is more preferably $Li_aNi_bCo_cAl_dO_2$ ($0 < a \leq 1.2$, $0.80 \leq b < 1$, $0 < c < 0.2$, $0 < d \leq 0.1$, and $b+c+d=1$).

For the conductive agent, known conductive agents that enhance an electroconductivity of the positive electrode mixture layer may be used. Examples thereof include carbon materials such as carbon black, acetylene black, Ketjenblack, graphite, carbon nanofiber, carbon nanotube, and graphene. For the binder, known binders that maintain a good contacting state of the positive electrode active material and the conductive agent and enhance adhesiveness of the positive electrode active material and the like to a surface of the positive electrode current collector may be used. Examples thereof include a fluororesin such as polytetrafluoroethylene (PTFE) and polyvinylidene fluoride (PVDF), polyacrylonitrile (PAN), a polyimide, an acrylic resin, a polyolefin, carboxymethyl cellulose (CMC) or a salt thereof, styrene-butadiene rubber (SBR), polyethylene oxide (PEO), polyvinyl alcohol (PVA), and polyvinylpyrrolidone (PVP).

The positive electrode 22 may be manufactured by, for example, applying a positive electrode mixture slurry including the positive electrode active material, the binder, the conductive agent, and the like on the positive electrode current collector, and drying and rolling the applied film to form the positive electrode mixture layer on the positive electrode current collector.

The negative electrode 23 comprises, for example, a negative electrode current collector and a negative electrode mixture layer formed on the negative electrode current collector. For the negative electrode current collector, a foil of a metal electrochemically and chemically stable within a potential range of the negative electrode, a film in which such a metal is disposed on a surface layer thereof, and the like may be used. A form of the negative electrode current collector is not particularly limited, and a porous body of the metal such as, for example, a mesh, a punching sheet, and an expanded metal may be used. For a material of the negative electrode current collector, known metals usable in a secondary battery using an aqueous electrolyte liquid and the like may be used. Examples of such a metal include Al, Ti, Mg, Zn, Pb, Sn, Zr, and In. These may be used singly, or may be in an alloy of two or more thereof, and may be constituted by a material mainly composed of at least one of the metals. When the material includes two or more elements, these elements are not necessarily alloyed. A thickness of the negative electrode current collector is preferably, for example, 3 μm or more and 50 μm or less from the viewpoints of current collectability, mechanical strength, and the like.

The negative electrode mixture layer includes a negative electrode active material. The negative electrode mixture layer may include a binder, a conductive agent, and the like. For the conductive agent and the binder, ones similar to the positive electrode side may be used.

The negative electrode active material includes the carbon material. The carbon material may have, as above, a peak intensity ratio of the D band to the G band (D/G value) of 0.3 or more in the Raman spectrum obtained by Raman spectroscopy from the viewpoint of inhibition of the reductive decomposition of the electrolyte liquid 27. The D/G value is preferably 0.4 or more from the viewpoint of further inhibition of the reductive decomposition of the electrolyte liquid 27. An upper limit is not particularly limited, but is preferably, for example, 0.8 or less from the viewpoint of possibility of increase in an amorphous part causing an excess formation of the coating on the surface of the negative electrode active material.

The Raman spectrum of the carbon material may be measured by using a commercially available Raman spectroscopic device. Preferable examples of the Raman spectroscopic device may include laser Raman microspectrometer "NRS-5100", manufactured by JASCO Corporation.

As described above, the carbon material has a full width at half maximum (2θ) of the diffraction peak of the (004) surface of preferably 1.0° or smaller, and more preferably 0.9° or smaller as determined by X-ray diffraction measurement, from the viewpoint of further inhibition of the reductive decomposition of the electrolyte liquid 27, as above. A lower limit of the full width at half maximum (2θ) of the diffraction peak of the (004) surface is preferably, for example, 0.1 or larger. When the full width at half maximum (2θ) of the diffraction peak of the (004) surface is larger than 1.0°, the D/G value does not satisfy the above range, an amorphous part inside the carbon material increases, and an excess coating may be formed on the carbon material.

The X-ray diffraction measurement of the carbon material is performed with powder X-ray diffraction by using a powder X-ray diffraction apparatus ("PANalytical X'pert Pro", manufactured by Malvern Panalytical Ltd.) under following conditions.

Radiation Source: Cu-Kα
Target/Filter: Cu/C
Tube Voltage/Tube Current: 45 kV/40 mA
Scanning Mode: Continuous
Step Width: 0.02°
Scanning Rate: 0.2 sec/step
Slit Width (DS/SS/RS): 0.5°/None/0.1 mm
Scanning Range: 10-100°

Although the carbon material may be composed of a material in which an entire particle is amorphous (amorphous carbon material) such as hard carbon from the viewpoint of the D/G value easily satisfying the above range, the carbon material is preferably, for example, a surface-modified carbon material in which a surface of graphite particles is coated with an amorphous carbon from the viewpoint in that not only the D/G value but also the full width at half maximum (2θ) of the diffraction peak of the (004) surface easily satisfy the above ranges. For example, in the surface-modified carbon material, a higher mass rate of the amorphous carbon and a thicker coating of the amorphous carbon may increase the D/G value of the carbon material. It is to be noted that the mass rate of the amorphous carbon in the surface-modified carbon material is needed to be regulated within an appropriate range because an excessively high mass rate may increase the full width at half maximum (2θ) of the diffraction peak of the (004) surface to be out of the above range. An amount of the amorphous carbon in the surface-modified carbon material is preferably 0.1 parts by mass or more and 50 parts by mass or less, and more preferably 0.1 parts by mass or more and 10 parts by mass or less, based on 100 parts by mass of the graphite. The amount of the amorphous carbon in the surface-modified carbon material within the above range easily provides the carbon material having the D/G value and full width at half maximum (2θ) of the diffraction peak of the (004) surface satisfying the above ranges.

The graphite to be a core of the surface-modified carbon material is, for example, a natural graphite such as flake graphite, massive graphite, and amorphous graphite; and an artificial graphite such as massive artificial graphite (MAG) and graphitized mesophase-carbon microbead (MCMB). The amorphous carbon with which the surface of the graphite particles is coated is, for example, a calcined product of petroleum pitch or tar, coal-tar pitch or tar, thermoplastic resin, thermosetting resin, or the like. The amorphous carbon is formed by, for example, adhering pitch on an entire surface of the graphite particles, and then calcining the mixture under an inert gas atmosphere at a temperature of 900 to 1500° C., preferably 1200 to 1300° C. The above method is an example, and conventionally known methods may be used as a method of coating the surface of the graphite particles with the amorphous carbon. A usable method is, for example, solid phase methods for coating such as a mechano-fusion method in which a compressive shear stress is applied between the graphite particles and the amorphous carbon for coating, and a spattering method; and a liquid phase method in which the amorphous carbon is dissolved in a solvent such as toluene and the graphite particles is immersed therein, then subjected to heat treatment.

The negative electrode active material may include materials usable for negative electrode active materials of conventional lithium-ion secondary batteries in addition to the above carbon material without impairing the effect of the present disclosure. Examples thereof include an alloy, metal compounds such as a metal oxide, a metal sulfide, and a metal nitride, which include a lithium element, and silicon. Examples of the alloy having the lithium element include lithium-aluminum alloy, lithium-tin alloy, lithium-lead alloy, and lithium-silicon alloy. Examples of the metal oxide having the lithium element include lithium titanate (such as $Li_4Ti_5O_2$). Examples of the metal nitride containing the lithium element include lithium-cobalt nitride, lithium-iron nitride, and lithium-manganese nitride. Sulfur-based compounds may also be exemplified.

The negative electrode 23 may be manufactured by, for example, applying a negative electrode mixture slurry including the negative electrode active material, the binder, and the like on the negative electrode current collector, drying and rolling the applied film to form the negative electrode mixture layer on the negative electrode current collector.

The separator 24 is not particularly limited as long as it has functions of lithium-ion permeation and electrical separation between the positive electrode and the negative electrode, and for example, a porous sheet composed of a resin, an inorganic material, or the like is used. Specific examples of the porous sheet include a fine porous thin film, a woven fabric, and a nonwoven fabric. Examples of the material of the separator include olefin resins such as polyethylene and polypropylene, a polyamide, a polyamideimide, and cellulose. Examples of the inorganic material constituting the separator include glass and ceramics such as borosilicate glass, silica, alumina, and titania. The separator may be a stacked body having a cellulose fiber layer and a thermoplastic resin fiber layer such as an olefin resin. The separator may be a multilayer separator including a polyethylene layer and a polypropylene layer, and may be a separator in which a material such as an aramid resin and ceramics is applied on a surface thereof.

EXAMPLES

Hereinafter, the present disclosure will be further described with Examples, but the present disclosure is not limited to these Examples.

Example 1

[Negative Electrode]

A surface-modified carbon material in which a surface of an artificial graphite is coated with an amorphous carbon was used as a negative electrode active material. An amount of the amorphous carbon in the surface-modified carbon material was 5 parts by mass based on 100 parts by mass of the artificial graphite.

The D/G value of the surface-modified carbon material in Example 1 was 0.41, and the full width at half maximum (2θ) of the diffraction peak of the (004) surface thereof was 1.070.

The above surface-modified carbon material (negative electrode active material) and PVDF as a binder were mixed at a solid-content mass ratio of 96:4 in N-methyl-2-pyrrolidone (NMP) to prepare a negative electrode mixture slurry. Next, this negative electrode mixture slurry was applied on a negative electrode current collector made of copper foil, and the applied film was dried and then rolled with a roller to produce an electrode.

[Positive Electrode]

$LiCoO_2$ as a positive electrode active material, carbon black as a conductive agent, and PVdF as a binder were mixed at a mass ratio of 94:3:3 in NMP to prepare a positive electrode mixture slurry. Next, this positive electrode mixture slurry was applied on a positive electrode current collector made of Al foil, and the applied film was dried and then rolled with a roller. Then, the rolled product was cut to a predetermined electrode size to obtain a positive electrode.

[Electrolyte Liquid]

Lithium salts (LITFSI:LIBETI=0.7:0.3 (molar ratio)) and water were mixed so that the molar ratio was 1:2, and 0.5 mass % of maleic anhydride and 0.5 mass % of succinic acid were added to the above mixed solution to prepare an electrolyte liquid.

[Three-Electrode Cell]

A three-electrode cell in which the negative electrode was a working electrode, the positive electrode was a counter electrode, Ag/AgCl (3M NaCl) was a reference electrode, and the above electrolyte liquid was injected was constructed.

Example 2

A surface-modified carbon material in which a surface of a natural graphite is coated with an amorphous carbon was used as a negative electrode active material. An amount of the amorphous carbon in the surface-modified carbon material was 5 parts by mass based on 100 parts by mass of the natural graphite. The D/G value of the surface-modified carbon material in Example 2 was 0.41, and the full width at half maximum (2θ) of the diffraction peak of the (004) surface thereof was 0.87°.

Example 3

A surface-modified carbon material in which a surface of a natural graphite is coated with an amorphous carbon was used as a negative electrode active material. An amount of the amorphous carbon in the surface-modified carbon material was 4 parts by mass based on 100 parts by mass of the natural graphite. The D/G value of the surface-modified carbon material in Example 3 was 0.37, and the full width at half maximum (2θ) of the diffraction peak of the (004) surface thereof was 0.91°.

A three-electrode cell was constructed in the same manner as in Example 1 except that the above surface-modified carbon material was used as the negative electrode active material.

Example 4

A surface-modified carbon material in which a surface of a natural graphite is coated with an amorphous carbon was used as a negative electrode active material. An amount of the amorphous carbon in the surface-modified carbon material was 5 parts by mass based on 100 parts by mass of the natural graphite. The D/G value of the surface-modified carbon material in Example 4 was 0.42, and the full width at half maximum (2θ) of the diffraction peak of the (004) surface thereof was 0.90°.

A three-electrode cell was constructed in the same manner as in Example 1 except that the above surface-modified carbon material was used as the negative electrode active material.

Example 5

A surface-modified carbon material in which a surface of a natural graphite is coated with an amorphous carbon was used as a negative electrode active material. An amount of the amorphous carbon in the surface-modified carbon material was 6 parts by mass based on 100 parts by mass of the natural graphite. The D/G value of the surface-modified carbon material in Example 5 was 0.45, and the full width at half maximum (2θ) of the diffraction peak of the (004) surface thereof was 0.92°.

A three-electrode cell was constructed in the same manner as in Example 1 except that the above surface-modified carbon material was used as the negative electrode active material.

Example 6

A surface-modified carbon material in which a surface of a natural graphite is coated with an amorphous carbon was used as a negative electrode active material. An amount of the amorphous carbon in the surface-modified carbon material was 5 parts by mass based on 100 parts by mass of the natural graphite. The D/G value of the surface-modified carbon material in Example 6 was 0.45, and the full width at half maximum (2θ) of the diffraction peak of the (004) surface thereof was 0.90°.

Lithium salts (LITFSI:LIBETI=1.0:0.4 (molar ratio)), fluoroethylene carbonate (FEC), and water were mixed so that the molar ratio was 1.4:2.6:1.2 to prepare an electrolyte liquid. No maleic anhydride nor succinic acid was added to the electrolyte liquid.

A three-electrode cell was constructed in the same manner as in Example 1 except that: the above surface-modified carbon material was used as the negative electrode active material; and the above electrolyte liquid was used.

Example 7

A surface-modified carbon material in which a surface of a natural graphite is coated with an amorphous carbon was used as a negative electrode active material. An amount of the amorphous carbon in the surface-modified carbon material was 5 parts by mass based on 100 parts by mass of the natural graphite. The D/G value of the surface-modified carbon material in Example 7 was 0.42, and the full width at half maximum (2θ) of the diffraction peak of the (004) surface thereof was 0.90°.

Lithium salts (LITFSI:LIBETI=0.7:0.3 (molar ratio)) and water were mixed so that the molar ratio was 1:2 to prepare an electrolyte liquid. No maleic anhydride nor succinic acid was added to the electrolyte liquid.

A three-electrode cell was constructed in the same manner as in Example 1 except that the above surface-modified carbon material was used as the negative electrode active material.

Comparative Example 1

An artificial graphite was used as a negative electrode active material. The D/G value of the artificial graphite in Comparative Example 1 was 0.13, and the full width at half maximum (2θ) of the diffraction peak of the (004) surface thereof was 1.37°.

A three-electrode cell was constructed in the same manner as in Example 1 except that the above artificial graphite was used as the negative electrode active material.

Comparative Example 2

A surface-modified carbon material in which a surface of an artificial graphite is coated with an amorphous carbon was used as a negative electrode active material. An amount of the amorphous carbon in the surface-modified carbon material was 2 parts by mass based on 100 parts by mass of the artificial graphite. The D/G value of the surface-modified carbon material in Comparative Example 2 was 0.25, and the full width at half maximum (2θ) of the diffraction peak of the (004) surface thereof was 1.02°.

A three-electrode cell was constructed in the same manner as in Example 1 except that the above surface-modified carbon material was used as the negative electrode active material.

Comparative Example 3

A surface-modified carbon material in which a surface of an artificial graphite is coated with an amorphous carbon was used as a negative electrode active material. An amount of the amorphous carbon in the surface-modified carbon material was 2 parts by mass based on 100 parts by mass of the artificial graphite. The D/G value of the surface-modified carbon material in Comparative Example 3 was 0.25, and the full width at half maximum (2θ) of the diffraction peak of the (004) surface thereof was 1.02°.

Lithium salts (LITFSI:LIBETI=0.7:0.3 (molar ratio)) and water were mixed so that the molar ratio was 1:2 to prepare an electrolyte liquid. No maleic anhydride nor succinic acid was added to the electrolyte liquid.

A three-electrode cell was constructed in the same manner as in Example 1 except that the above surface-modified carbon material was used as the negative electrode active material.

By using the three-electrode cells of Examples 1 to 5, Example 7, and Comparative Examples 1 to 3, linear sweep voltammetry measurement was performed to measure a reduction peak current (mA/cm$^2$) of the negative electrode. The measurement condition is shown below.

Start Potential: OCV

Potential Scanning Range: −3.24 V to OCV vs. Ag/AgCl (3M NaCl)

Sweep Rate: 0.1 mV/sec

Measurement Temperature: 25° C.

Table 1 shows the measurement results of the reduction peak currents of the negative electrodes in Examples 1 to 5, Example 7, and Comparative Examples 1 to 3. The values of the reduction peak currents in Table 1 shown are relative values relative to the value of Comparative Example 1 of 100, in the other Examples and Comparative Examples. The measured reduction peak current of the negative electrode is derived from the reduction reaction of the electrolyte liquid. Thus, a reduction peak current of the negative electrode shown in Table 1 being lower than 100 indicates an inhibited reduction reaction of the electrolyte liquid compared with Comparative Example 1.

TABLE 1

| | Carbon material | | | Reduction peak current (relative value relative to value of Comparative Example 1 of 100) |
| | D/G value | Full width at half maximum (2θ) of peak of (002) surface | Electrolyte liquid | |
| --- | --- | --- | --- | --- |
| Example 1 | 0.41 | 1.07 | Aqueous electrolyte + additive | 62 |
| Example 2 | 0.41 | 0.87 | Aqueous electrolyte + additive | 35 |
| Example 3 | 0.37 | 0.91 | Aqueous electrolyte + additive | 55 |
| Example 4 | 0.42 | 0.90 | Aqueous electrolyte + additive | 30 |
| Example 5 | 0.45 | 0.92 | Aqueous electrolyte + additive | 19 |
| Example 7 | 0.42 | 0.90 | Aqueous electrolyte | 90 |
| Comparative Example 1 | 0.13 | 1.37 | Aqueous electrolyte + additive | 100 |
| Comparative Example 2 | 0.25 | 1.02 | Aqueous electrolyte + additive | 87 |
| Comparative Example 3 | 0.25 | 1.02 | Aqueous electrolyte | 115 |

Composition of aqueous electrolyte: LiTFSI (0.7) + LiBETI (0.3) + H2O (2.0) Numeral in () is a molar ratio.

Additive: 0.5 mass % maleic anhydride + 0.5 mass % succinic acid mass % is a rate based on a mass of the electrolyte liquid.

As is evident from Table 1, Examples 1 to 5 and 7, which used the carbon material having a D/G value of 0.3 or more, had lower reduction peak currents than Comparative Example 1 with the D/G value of less than 0.3, resulting in inhibition of the reduction reaction of the electrolyte liquid. Among Examples 1 to 5 and 7, Examples 1 to 5 with the additives (succinic acid and maleic anhydride) added to the electrolyte liquid had even lower reduction peak currents, resulting in further inhibition of the reduction reaction of the electrolyte liquid. Moreover, Examples 2 to 5 with the full width at half maximum (2θ) of the diffraction peak of the (004) surface of 1.0° or smaller had even lower reduction peak currents, resulting in further inhibition of the reduction reaction of the electrolyte liquid.

By using the three-electrode cell of Example 6, cyclic voltammetry measurement was performed to evaluate an initial charge-discharge efficiency. The measurement condition is shown below.

Start Potential: OCV

First Loopback Potential: −3.24 V vs. Ag/AgCl (3M NaCl)

Second Loopback Potential: −0.238 V vs. Ag/AgCl (3M NaCl)

Number of Cycles: 2

Sweep Rate: 0.1 mV/sec

Measurement Temperature: 25° C.

Charge-Discharge Efficiency: (Oxidation Current (C)/Reduction Current (C))×100

The three-electrode cell of Example 6, which used the carbon material having a D/G value of 0.3 or more and a full width at half maximum (2θ) of the diffraction peak of the (004) surface of 1.0° or smaller, lowered the reduction peak current derived from the reduction reaction of the electrolyte liquid, similar to the other Examples, and in addition, increased the peak current derived from the charge and discharge reactions compared with the other Examples. This is presumed to be an effect by adding FEC to the electrolyte liquid.

REFERENCE SIGNS LIST

20 Secondary battery
21 Battery case
22 Positive electrode
23 Negative electrode
24 Separator
25 Gasket
26 Sealing plate
27 Electrolyte liquid

The invention claimed is:

1. A secondary battery, comprising:
a positive electrode;
a negative electrode; and
an electrolyte liquid, wherein
the electrolyte liquid includes: a solvent mainly composed of water; and a lithium salt,
the negative electrode has a negative electrode active material including a carbon material,
the carbon material has a peak intensity ratio of a D band to a G band (D/G value) of 0.3 or more and 0.8 or less in a Raman spectrum obtained by Raman spectroscopy, and has a full width at half maximum of a diffraction peak of a (004) surface of 1.0° or smaller as determined by X-ray diffraction measurement, and
the carbon material is a surface-modified carbon material comprising graphite and an amorphous carbon coating a surface of the graphite.

2. The secondary battery according to claim 1, wherein the electrolyte liquid includes a dicarbonyl group-containing compound.

3. The secondary battery according to claim 2, wherein the dicarbonyl group-containing compound includes at least one of succinic acid and maleic anhydride.

4. The secondary battery according to claim 1, wherein the carbon material has a peak intensity ratio of a D band to a G band (D/G value) of 0.3 or more and 0.45 or less in a Raman spectrum obtained by Raman spectroscopy.

* * * * *